(12) United States Patent
Turner

(10) Patent No.: US 11,820,535 B2
(45) Date of Patent: Nov. 21, 2023

(54) SMALL SATELLITE CONSTELLATION FOR WORLDWIDE SURVEILLANCE

(71) Applicant: Maxar Space LLC, Palo Alto, CA (US)

(72) Inventor: Andrew E. Turner, Mountain View, CA (US)

(73) Assignee: Maxar Space LLC, Palo Alto, CA (US)

( * ) Notice: Subject to any disclaimer, the term of this patent is extended or adjusted under 35 U.S.C. 154(b) by 78 days.

(21) Appl. No.: 17/478,531

(22) Filed: Sep. 17, 2021

(65) Prior Publication Data
US 2023/0108764 A1    Apr. 6, 2023

(51) Int. Cl.
*B64G 1/10*    (2006.01)

(52) U.S. Cl.
CPC ......... *B64G 1/1078* (2013.01); *B64G 1/1021* (2013.01); *B64G 1/1085* (2013.01); *B64G 1/1028* (2023.08)

(58) Field of Classification Search
CPC .. B64G 1/1078; B64G 1/1021; B64G 1/1085; B64G 2001/1028
See application file for complete search history.

(56) References Cited

U.S. PATENT DOCUMENTS

| | | | |
|---|---|---|---|
| 5,299,764 A | 4/1994 | Scott | |
| 6,845,303 B1 | 1/2005 | Byler | |
| 10,435,183 B1 | 10/2019 | Schwarz | |
| 10,538,347 B1 | 1/2020 | Turner et al. | |
| 2007/0125910 A1* | 6/2007 | Cepollina | B64G 1/007 244/172.6 |
| 2013/0105632 A1* | 5/2013 | Sainct | B64G 1/1085 244/158.6 |
| 2017/0113818 A1* | 4/2017 | Mori | B64G 1/648 |

(Continued)

FOREIGN PATENT DOCUMENTS

| | | | | |
|---|---|---|---|---|
| CN | 106494646 B | * | 3/2019 | ............... B64G 1/24 |
| EP | 2489593 | | 8/2012 | |

(Continued)

OTHER PUBLICATIONS

Bouwmeester (doc. "Preliminary Mission Results and Project Evaluation of the Delfi-C3 Nano-Satellite" (Year: 2008).*

(Continued)

*Primary Examiner* — Assres H Woldemaryam
(74) *Attorney, Agent, or Firm* — Vierra Magen Marcus LLP

(57) ABSTRACT

A satellite observation system and method of deploying a satellite system are disclosed. The system includes a plurality of observation satellites comprising one or more sensors, each of the plurality of observation satellites configured with at least a solar array and a mechanical stabilization element. Each of the plurality of observation satellites is constructed without positioning components. The plurality of observation satellites is positioned in a dawn/dusk sun-synchronous orbital plane about a celestial body such that the one or more observation sensors are oriented toward the celestial body. The system further includes one or more servicing vehicles configured to engage each of the plurality observational satellites to configure at least the solar array and mechanical stabilization element

20 Claims, 9 Drawing Sheets

(56) References Cited

U.S. PATENT DOCUMENTS

| | | |
|---|---|---|
| 2018/0346155 A1 | 12/2018 | Spangelo et al. |
| 2020/0262589 A1* | 8/2020 | Turner .................. B64G 1/244 |
| 2021/0088651 A1* | 3/2021 | Neto ........................ G01S 7/03 |
| 2021/0122501 A1* | 4/2021 | Turner .................. B64G 1/222 |
| 2022/0242597 A1 | 8/2022 | Mukae |

FOREIGN PATENT DOCUMENTS

| | | | |
|---|---|---|---|
| WO | WO-2020261481 A1 * | 12/2020 | .............. E05C 3/06 |
| WO | 2021039652 | 3/2021 | |

OTHER PUBLICATIONS

Prior art date Bouwmeester (doc. "Preliminary Mission Results and Project Evaluation of the Delfi-C3 Nano-Satellite".*
Qureshi, Atif M. et al., "Constellation Tending: An Application of On-Orbit Servicing and Active Debris Removal Technologies", ASCEND 2020, Nov. 16-18, 2020, pp. 1-20.
Turner, Andrew E., "Cost-Effective Spacecraft Dependent Upon Frequent Non-Intrusive Servicing", AIAA 2001-4554, pp. 1-13.
Jewett, Rachel, "Millennium Space Systems Reveals Previously Undisclosed DARPA Red-Eye Mission", Jul. 20, 2022, pp. 1-6.
Extended European Search Report dated Feb. 10, 2023, European Patent Application No. 22192936.7.
Response to Extended European Search Report dated Sep. 20, 2023, European Patent Application No. 22192936.7.

* cited by examiner

SMALL SATELLITE CONSTELLATION FOR WORLDWIDE SURVEILLANCE

BACKGROUND

The present disclosure relates to technology for satellite surveillance systems. Satellite surveillance systems typically include one or more satellites and a set of ground terminals which communicate with the satellites. Some such systems use dawn/dusk sun-synchronous orbits which allow a satellite's solar arrays to be exposed to Sun. Observation satellites are generally positioned and re-positioned to overfly specific targets on Earth's surface. As such, substantial cost is involved in the manufacture of such satellites as they require batteries, thrusters, fuel, inertial sensors, telemetry and ranging communication, processing and thermal control.

SUMMARY

One aspect of the present disclosure includes a satellite observation system. The system includes a plurality of observation satellites comprising one or more passive sensors, each of the plurality of observation configured with at least a solar array and a mechanical stabilization element. The mechanical stabilization element is nominally passive, meaning that it does not consume electrical or other power and does not require active control. Each of the plurality of observation satellites is constructed without at least thrusters, fuel, and inertial sensors. The system includes the plurality of observation satellites positioned in a dawn/dusk sun-synchronous orbital plane about a celestial body such that the one or more observation sensors are oriented toward the celestial body. The system further includes one or more servicing vehicles configured to engage each of the plurality observational satellites to configure at least the solar array and mechanical stabilization element.

In further aspects, the one or more servicing vehicles are configured to engage any of the plurality of observation satellites upon a malfunction of a component of the observation satellite. In further aspects, the one or more servicing vehicles is configured to reposition any of the plurality of observation satellites when a change in position of the one or more observation satellites is detected or desired. In further aspects, the observation sensors are optical sensors. In further aspects, the one or more servicing vehicles are configured to engage the observation satellite to induce rotation of the observation satellite about an inertial axis of the observation satellite. In further aspects, each of the observation satellites is constructed without energy storage. In further aspects, the celestial body is Earth, and wherein the plurality of observation satellites and observation sensors, when positioned in the orbital plane, are evenly spaced such that every point on Earth's surface is observed as Earth rotates though the orbital plane.

In another aspect, a method of deploying an orbital observation system is described. The method includes: launching a plurality of observation satellites comprising one or more passive sensors, each of the plurality of observation configured with at least a solar array and a mechanical stabilization element, each of the plurality of observational satellites configured without at least thrusters, fuel, and inertial sensors; positioning the plurality of observation satellites in a dawn/dusk sun-synchronous orbital plane about a celestial body such that the one or more passive sensors are oriented toward the celestial body; launching one or more servicing vehicles; and directing the one or more servicing vehicles to deploy at least the solar array and mechanical stabilization element of each of the plurality observational satellites.

In additional aspects, the method includes each said launching is performed being simultaneously in a single launch vehicle. In additional aspects, the method includes the one or more servicing vehicles engaging any of the plurality of observation satellites upon a malfunction of a component of the observation satellite. In additional aspects, the method includes the one or more servicing vehicles repositioning any of the plurality of observation satellites when a change in position of the one or more observation satellites in the orbital plane is detected or desired. In additional aspects, the method includes positioning the plurality of observation satellites such that the orbital plane completely surrounds the celestial body and wherein the plurality of observation satellites and observation sensors, when positioned in the orbital plane, are evenly spaced such that every point on Earth's surface is exposed to the observation sensors of the plurality of observation satellites as the celestial body rotates though the orbital plane. In additional aspects, the method includes directing the one or more servicing vehicles to engage the observation satellite to induce rotation of the observation satellite about an inertial axis of the observation satellite.

In yet another aspect, a satellite constellation system is provided. The system comprises a plurality of low-cost, limited-function satellites comprising one or more passive sensors, each of the plurality of limited-function configured with at least a solar array and a mechanical stabilization element, each of the plurality of limited-function satellites constructed without positioning components, the plurality of limited-function satellites positioned in a dawn/dusk sun-synchronous orbital plane about a celestial body such that the one or more sensors are oriented toward the celestial body. In addition, the system includes one or more servicing vehicles configured to engage each of the plurality limited-function satellites to configure at least the solar array and mechanical stabilization element.

In further aspects, the one or more servicing vehicles are configured to engage the limited-function satellite to induce rotation of the limited-function satellites about an inertial axis of the limited-function satellite. In further aspects, the one or more servicing vehicles are configured to reposition any one of the plurality of limited-function satellites when a change in position of one of the plurality of limited-function satellites in the orbital plane is detected. In further aspects, each of the limited-function satellites is constructed without energy storage. In further aspects, the celestial body is Earth, and wherein the plurality of limited-function satellites and sensors, when positioned in the orbital plane, are evenly spaced such that every point on Earth's surface is observed as Earth rotates though the orbital plane. In further aspects, the sensors are optical sensors. In further aspects, the limited-function satellites may be placed in an inverted attitude mode by the servicing vehicles and later restored to nominal attitude mode to enhance survivability during a lunar eclipse or other event.

BRIEF DESCRIPTION OF THE DRAWINGS

Aspects of the present disclosure are illustrated by way of example and are not limited by the accompanying figures for which like references indicate the same or similar elements.

DETAILED DESCRIPTION

In one embodiment, a cost-effective satellite constellation system provides coverage of the entire dawn and dusk regions of a celestial body such as Earth. The constellation uses a large number of low-cost, limited function spacecraft distributed around the body in a dawn/dusk sun-synchronous orbital plane. In one embodiment, the low-cost, limited function spacecraft are observation satellites, although the spacecraft can be constructed to provide functionality other than observation. The low cost, limited function spacecraft are economical because they lack active and/or complex features in the propulsion, attitude control, power and thermal subsystems, and because of support provided by on-orbit servicing vehicles. The low-cost, limited function spacecraft are designed to be serviced and operated for many years.

The system enables the cost of the spacecraft, and the satellite constellation as a whole, to be greatly reduced, providing an economical worldwide surveillance system. The large number of low-cost, low-mass spacecraft that can be produced can be distributed throughout a single orbital plane, enabling every point in the twilight region of the celestial body to be observed at all times. The system described herein would observe all regions of the twilight region, rather than being maneuvered to overfly specific targets on body's surface, because of the large number of spacecraft and the small separation between adjacent satellites. The low-mass and small size of the spacecraft enables the entire constellation to be carried on a single economical launch vehicle, or a few launch vehicles, thereby minimizing implementation costs.

Figure 1A:
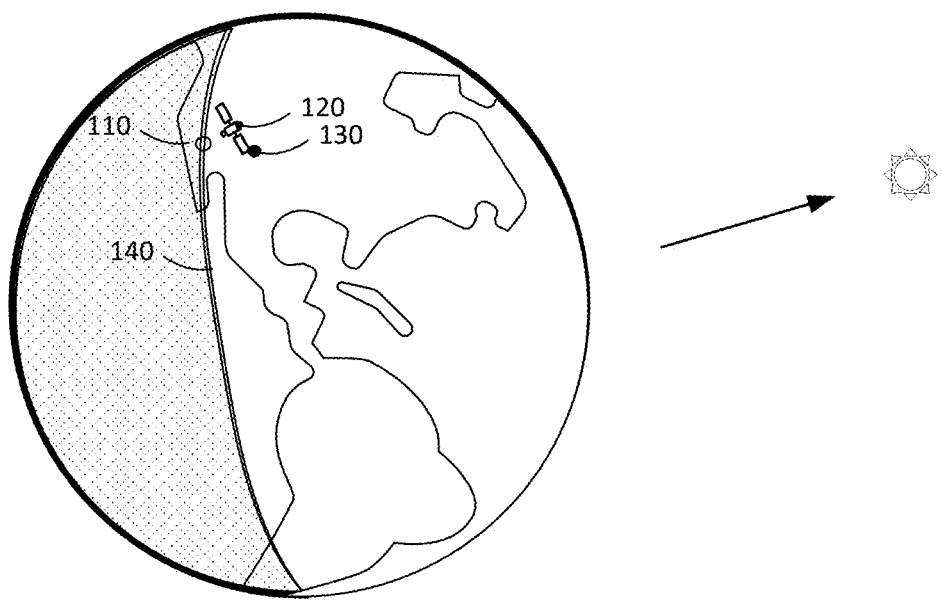
FIG. 1A is a depiction of a satellite sub-point and observation point relative to a celestial body such as Earth.

FIG. 1A is a depiction of an observation satellite 120, satellite sub-point 130 directly beneath the satellite on the surface of the body, also an observation point 110 relative to a celestial body such as Earth in a perspective view. A satellite 120 may be positioned to observe the surface of the body at the terminator region 140—the region between night and day. Current observation satellites can measure the lengths of shadows cast by objects such as buildings, ships and other large vehicles, the twilight regions of the world as the sun is rising or setting, using optical, infrared or other passive sensors.

Figure 1B:
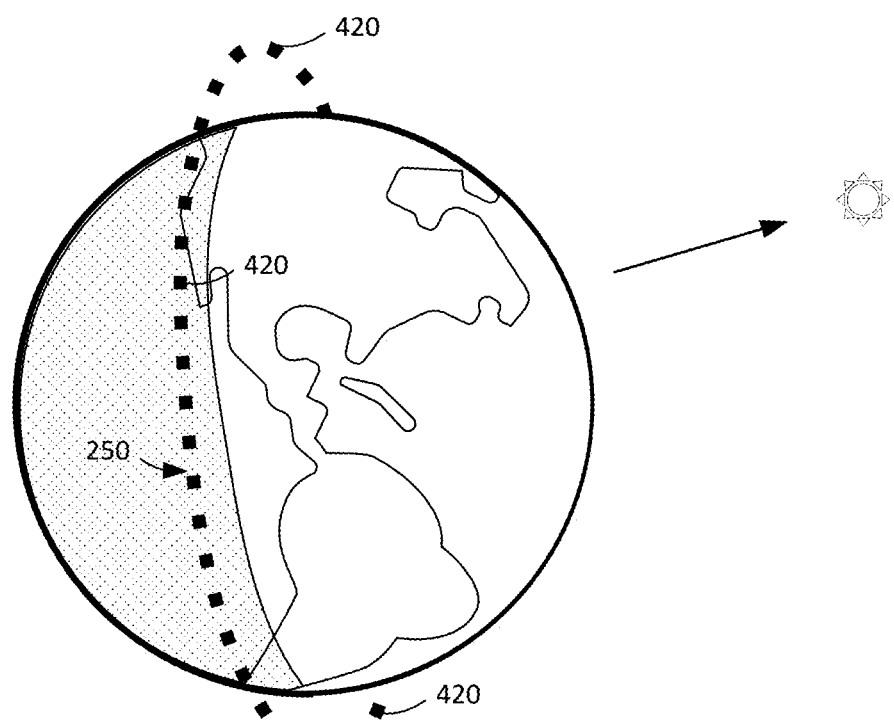
FIG. 1B is a depiction of a satellite constellation system which may be used for observation of a celestial body such as Earth.

FIG. 1B is a depiction of the satellite constellation system which may be utilized to perform worldwide surveillance. The satellite constellation system includes a large number of observation satellites 420 are arranged in an orbital plane 250. The system also includes one or more servicing vehicles (not shown in FIG. 2). The satellites 420 are, in one embodiment, evenly spaced to ensure that every point on Earth's surface is observed as Earth rotates though the orbital plane 250. Each satellite may be configured to observe a corresponding observation point to, for example, measure the lengths of shadows cast by objects at the terminator region as the sun is rising or setting, using optical, infrared or other passive sensors. Worldwide surveys can be made twice a day using the constellation of many low-cost spacecraft in a dawn/dusk sun-synchronous orbit.

Figure 2B:
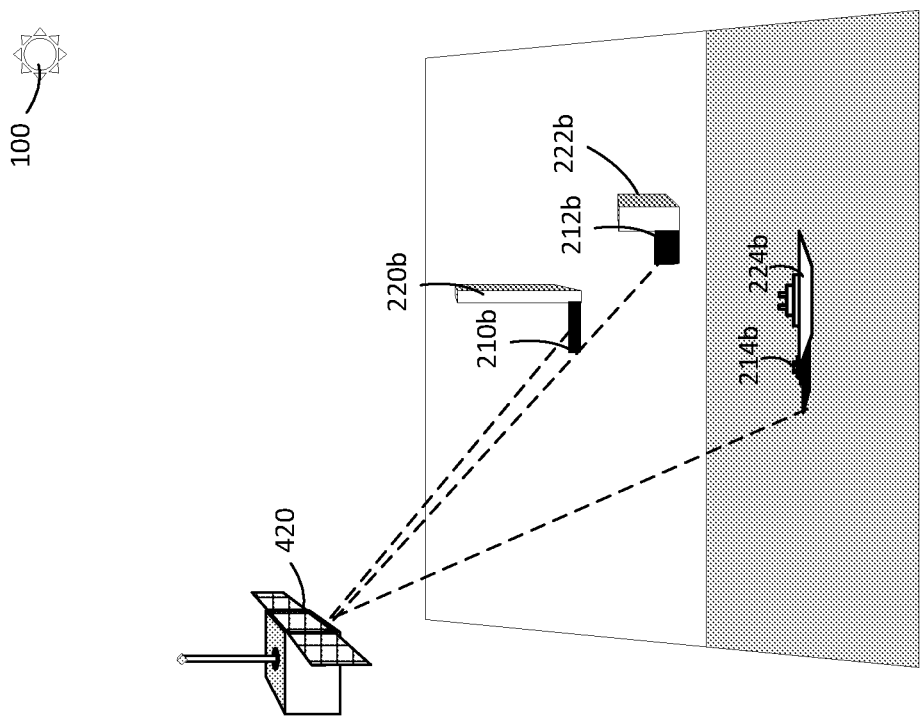
FIGS. 2A and 2B are depictions of the lengths of shadows case by objects relative to the object height and sun position.
Figure 2A:
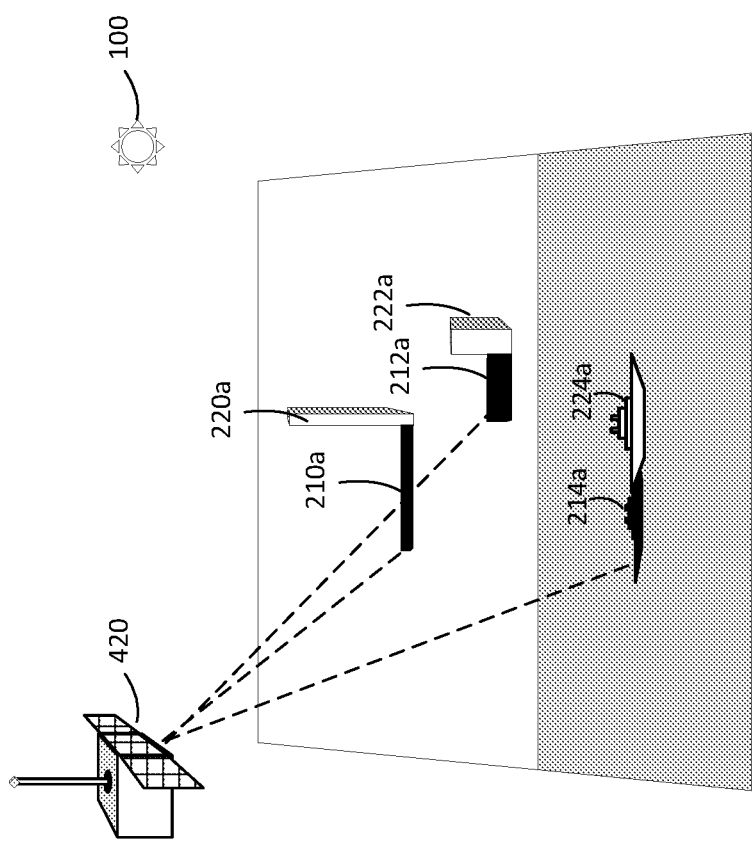

FIGS. 2A and 2B are depictions of the lengths of shadows 210a, 210b, 212a, 212b, 214a, 214b cast by objects shadows (220a, 220b, 222a, 222b, 224a, 224b) relative to the object height and sun 100 position. FIGS. 2A and 2B show that the lengths of shadows 210a, 210b, 212a, 212b, 214a, 214b cast by objects at twilight (FIG. 2A) depends on their heights and these shadows are observable from a satellite. The shadow lengths can be used to measure the heights of objects and to detect ships at sea. The application of camouflage using painting or similar techniques to these items will not prevent them from casting shadows, therefore detection by the observation satellites described here will be difficult or impossible to avoid as indicated in FIG. 1B. Shadow observations occur at a different time of day than conventional imaging, providing a broader scope of time-of-day viewing. Shadows will be shorter (FIG. 2B), for example, at mid-day, and might be not be recognizable because of ground clutter.

The observation satellite 420 can be launched along with a higher-cost, propulsion equipped, tele-robotic servicing vehicle or multiple servicing vehicle a single mass launch or multiple launches. In one embodiment, the system may use the techniques described in U.S. Pat. No. 10,538,347 such that the observation satellite 420 may be extracted from a shock-absorbing structure or "shock dam" in the launch vehicle by the caretaker spacecraft. This enables the observation satellites 420 to be built as simple boxes that are unable to survive the stress of launch without being mounted within a shock dam. Hundreds or thousands of observation satellites 420 may be launched at a time, such that a single launch could provide a fully operational system. The exact number of observation satellites 420 may vary with a number of factors, including the type of sensor equipment carried by the satellite, the size of the satellite and the resolution of the sensor equipment.

The satellites operate at an altitude of about 1,500 km, or higher, with an orbital inclination of 101.9°, or higher for a higher altitude orbit, and a right ascension of ascending node (RAAN) of about 180° (or RAAN of about)0° at December solstice or December 22 so they never enter Earth's shadow. This benign environment, with continuous sunlight for power and regular thermal conditions greatly simplifies satellite design. The satellites utilize require radiation-resistant electronic parts, also optionally thick cover-glass shielding on the solar arrays because radiation exposure is relatively high at this altitude. Equipping the spacecraft with gold flashing or beta cloth to resist atomic oxygen exposure would not be necessary because atomic oxygen is not found at this altitude.

Figure 3:
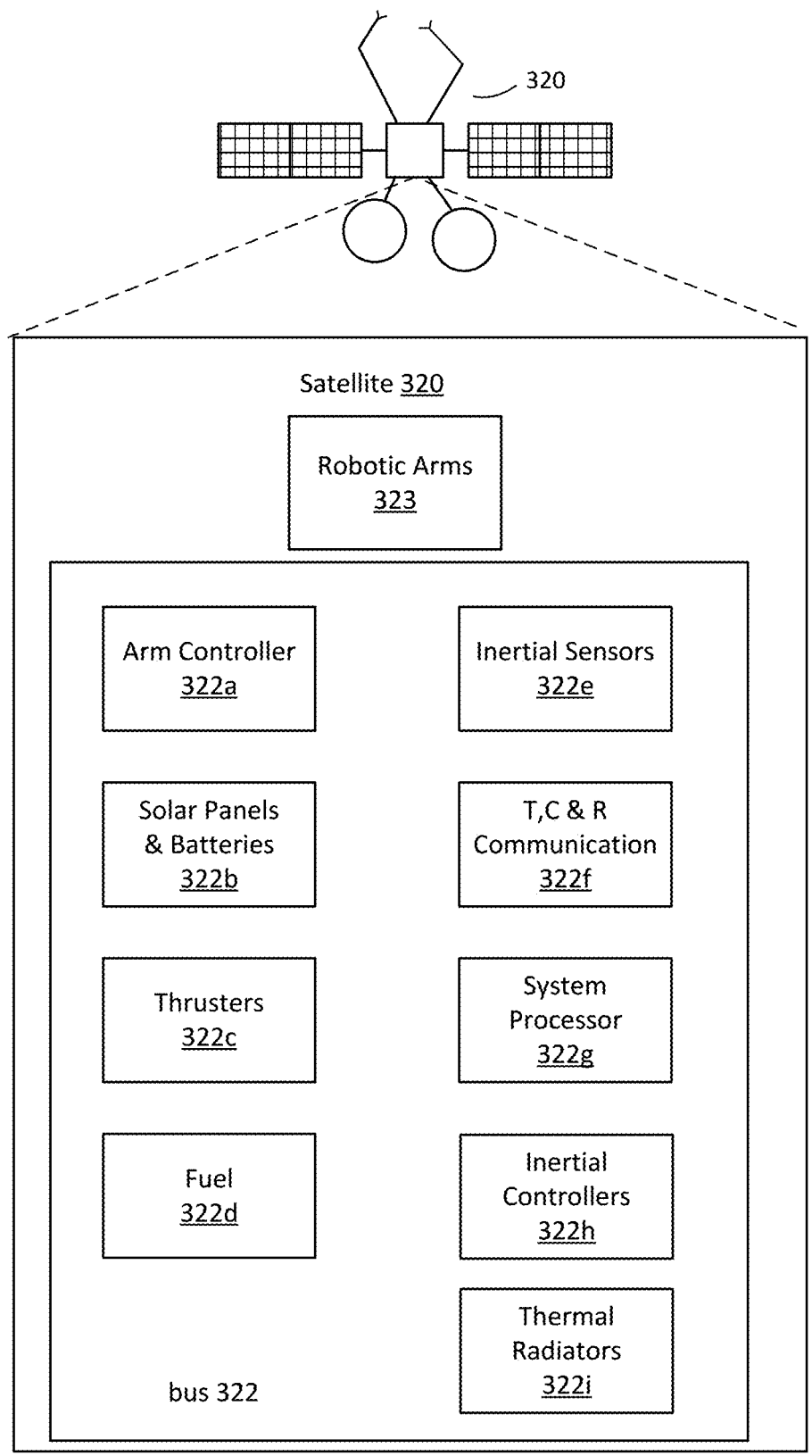
FIG. 3 is a high-level block diagram providing exemplary details of a servicing spacecraft.

FIG. 3 is a high-level block diagram providing exemplary details of a servicing vehicle 320. In one embodiment, the vehicle 320 includes a bus 322 and robotic arm or arms 323. Some embodiments of the satellite 320 may include more one or multiple robotic arms 323. The arms 323 can be adapted to specifically engage the observation satellites 420.

In general, the bus 322 additionally includes one or more arm controllers 322a for interfacing with arms 323, solar panels and one or more batteries 322b, thrusters 322c, fuel 322d, inertial sensors 322e, T, C & R (telemetry, commanding and ranging) communication and processing equipment 322f, and system processor 322g. T,C & R may referred to by other names, such as T,T & C (tracking, telemetry and control), as is known in the art. Solar panels (arrays) and batteries 322b are used to provide power to satellite 320. Thrusters 322c and inertial controllers 322h are used for changing the position or orientation of vehicle 320 while in space. Thermal radiators 322i passively radiate excess heat generated by the servicing vehicle into space and may be located on the portion of the vehicle that is nominally directed away from Earth, i.e. toward the zenith. Fuel 322d is for the thrusters. Inertial sensors 322e are used to determine the position and orientation of satellite 320. T, C & R communication and processing equipment 322f, includes communication and processing equipment for telemetry, commands from the ground to the satellite and ranging to operate the satellite. System processor 322g is used to control and operate satellite 320. An operator on the ground can control satellite 320 by sending commands via T,C & R communication equipment 322f to be executed by system processor 322g. The system processor 322g includes memory and code operable to instruct the processor to perform the methods described herein. In one aspect, the inertial controllers and inertial sensors may be referred to as an attitude control subsystem may further involve the use of rotating wheels, which are referred to as reaction wheels, internal to the spacecraft body. The rotation rates of these wheels may be altered to generate torques on the spacecraft body to cause it to rotate around its axes, including its roll axis.

Figure 4:
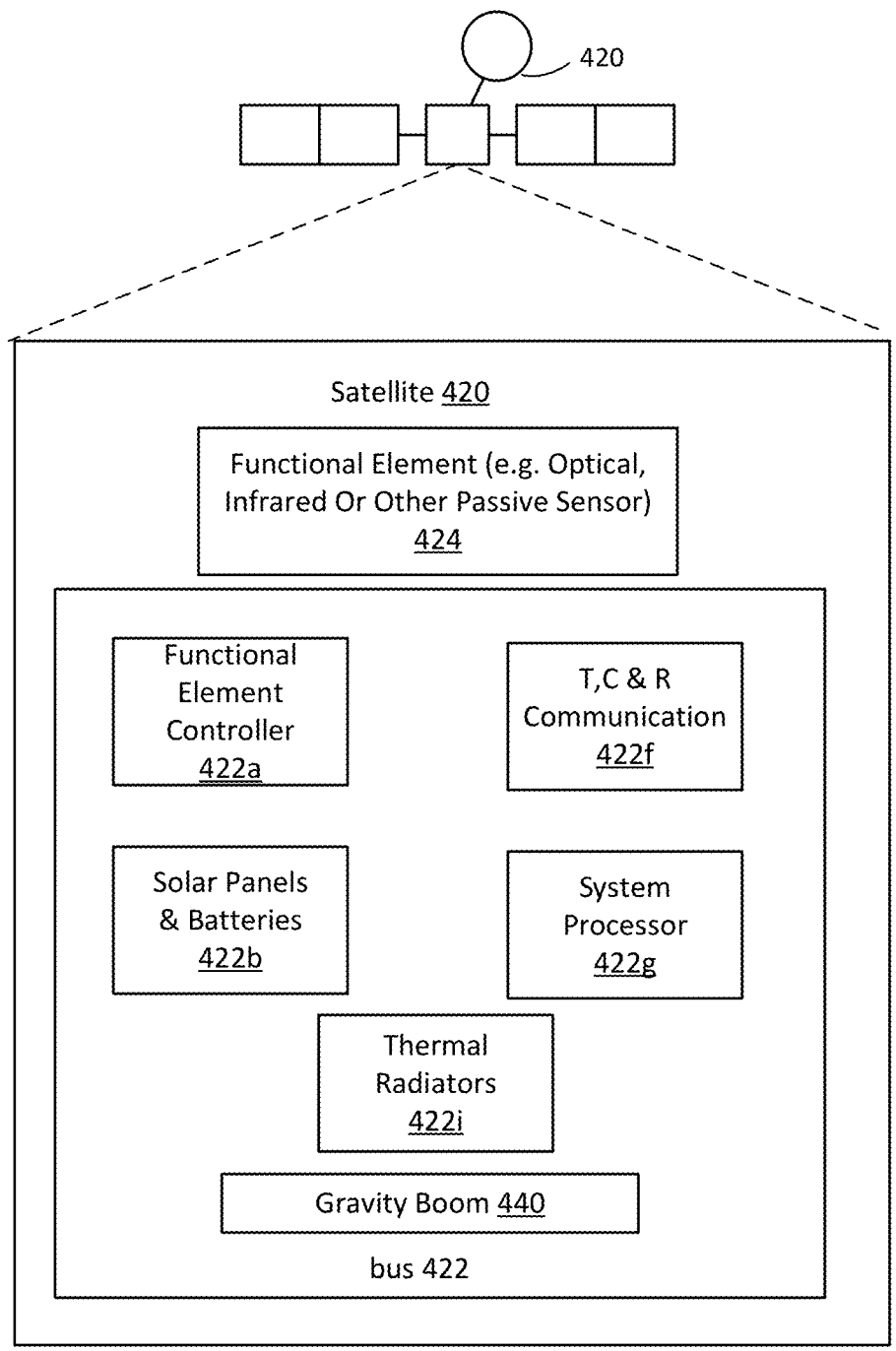
FIG. 4 is a high-level block diagram providing exemplary details of a limited function small spacecraft.

FIG. 4 is a high-level block diagram providing exemplary details of an observation satellite 420. In one embodiment, the satellite 420 includes a bus 422 and a functional element 424. In one embodiment, the functional element may comprise one or more sensors, such as optical sensors, infrared sensors and/or other passive sensors, designed to conduct observations of the celestial body. The satellite 420 may also include a functional element controller 422a, solar panels and one or more batteries 422b, T, C & R communication and processing equipment 422f, system processor 422g and thermal radiators 422i. Radiators 422i may be located on the portion of the observation satellite that is nominally directed away from Earth, i.e. toward the zenith. This prevents heat emissions and albedo (reflected sunlight) from Earth from entering the radiators 422i during nominal operation. Furthermore, in the present system, the observation satellites are positioned so that the sun is never in the zenith direction from the observation satellite but is always at a direction nearly perpendicular to the zenith, as shown in FIG. 1B, avoiding solar thermal loading of the radiators 422i as well. Some embodiments of the satellite 420 may not include energy storage such as batteries. Observation satellite 420 also includes a mechanical stabilization element comprising gravity-gradient boom in 440 which is used to passively maintain the observation satellite 420 aligned with the local vertical. (The mechanical stabilization element is nominally passive, meaning that it does not consume electrical or other power and does not require active control.)

The observation satellites 420 do not include positioning components such as thrusters, propellant tanks and other propulsion hardware, but can be maneuvered into position by servicing vehicles 320. The observation satellites 420 do not include positioning components such as reaction wheels or other attitude control actuators but can be set into the proper attitude by servicing vehicles 320. The observation satellites 420 do not require complex power subsystems including rechargeable batteries because they never enter Earth's shadow, but for contingency recovery they could use lower-cost non-rechargeable batteries or receive electrical power conveyed to them by servicing vehicles. The observation satellites 420 do not require complex thermal control subsystems including heat pipes or thermostatically controlled electric heaters because they do not enter Earth's shadow, partly because of corrections to perturbations of their orbits which are applied by the servicing vehicles 320. The observation satellites 420 are also simplified by using techniques, described herein, to reduce thermal and other stress by avoiding Earth eclipse passage. The observation satellites 420 benefit from a low-stress launch environment that enables their structure to be further simplified as discussed in U.S. Pat. No. 10,538,347. Besides the reduction in satellite cost, the mass and size is reduced over existing observation satellites.

This constellation system enables the cost of the spacecraft to be greatly reduced, resulting in a worldwide surveillance system which can implemented economically. A large number of low-cost, low-mass observation satellites 420 that can be produced can be distributed throughout the single orbital plane, enabling every point in the twilight region of the world to be observed at all times. Although the prior art utilizes small numbers of spacecraft which must be maneuvered to overfly specific targets on Earth's surface, the system described here would observe all regions because of the large number of spacecraft and the small separations between adjacent satellites. The low-mass and small size of the spacecraft enables the entire constellation to be carried on a single economical launch vehicle, minimizing launch cost.

Figure 5:
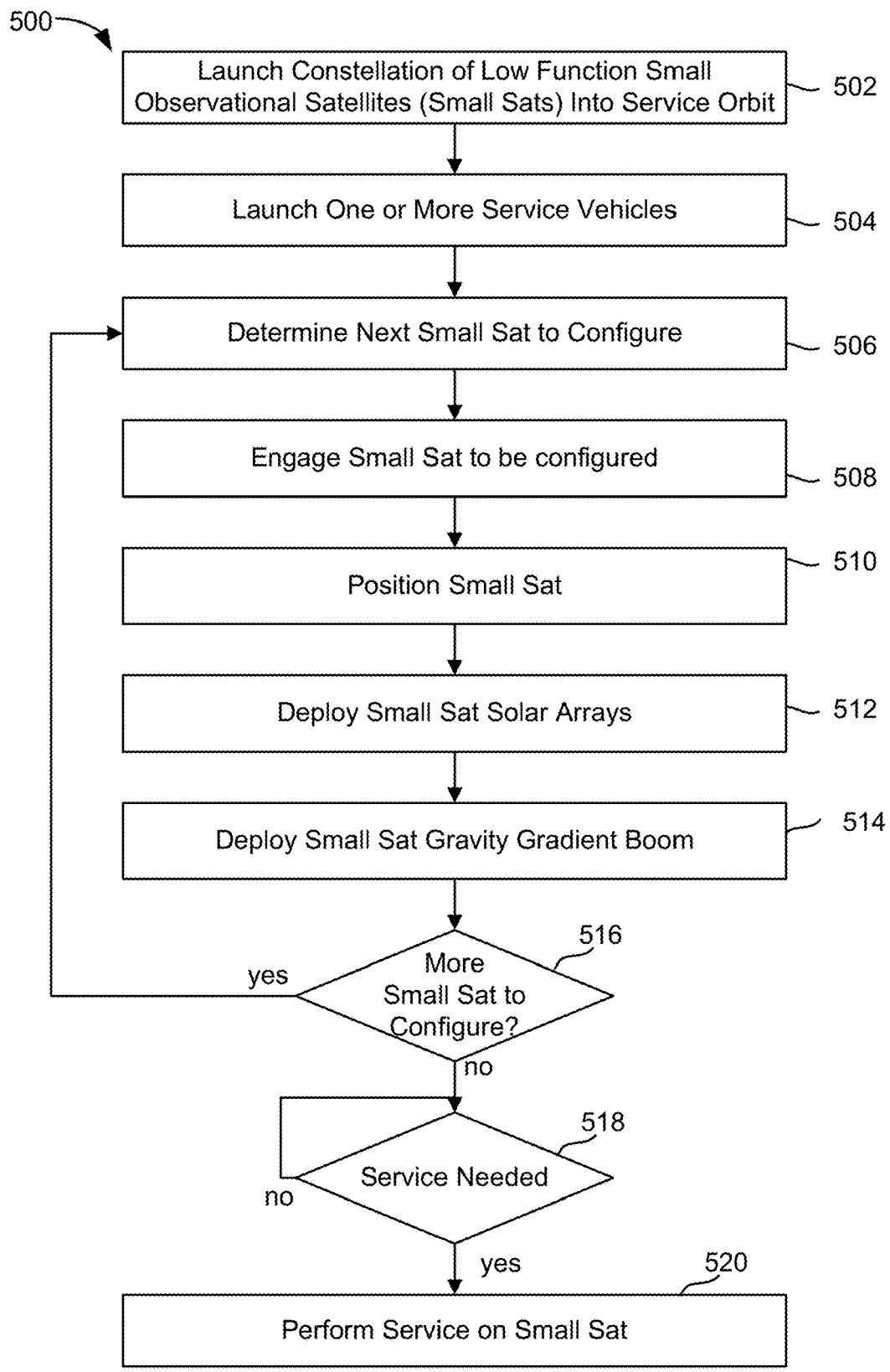
FIG. 5 is a flowchart of a method for configuring a satellite constellation.

FIG. 5 illustrates one embodiment of a method for establishing a satellite constellation system in accordance with the present technology. FIG. 5 will be discussed with reference to FIGS. 6-8. At 502, a plurality of low-cost small satellites may be launched into space. Steps 502 and 504 may be performed together, in one launch, or separately, and may be performed in a different number than illustrated. Alternatively, a portion of the ultimate number of observation satellites may be launched with one or more servicing vehicles. In one embodiment, the satellites may be launched into an initial parking orbit which is different from the operational orbit and they would be transferred to the operational orbit by the servicing vehicles. In another embodiment, the observation satellites may be launched into an orbit which differs only slightly from the operational orbit and would be positioned by the servicing vehicle. The plurality of observation satellites may number in the hundreds or thousands while the plurality of the servicing vehicles would be far smaller because of their higher cost.

Figure 6:
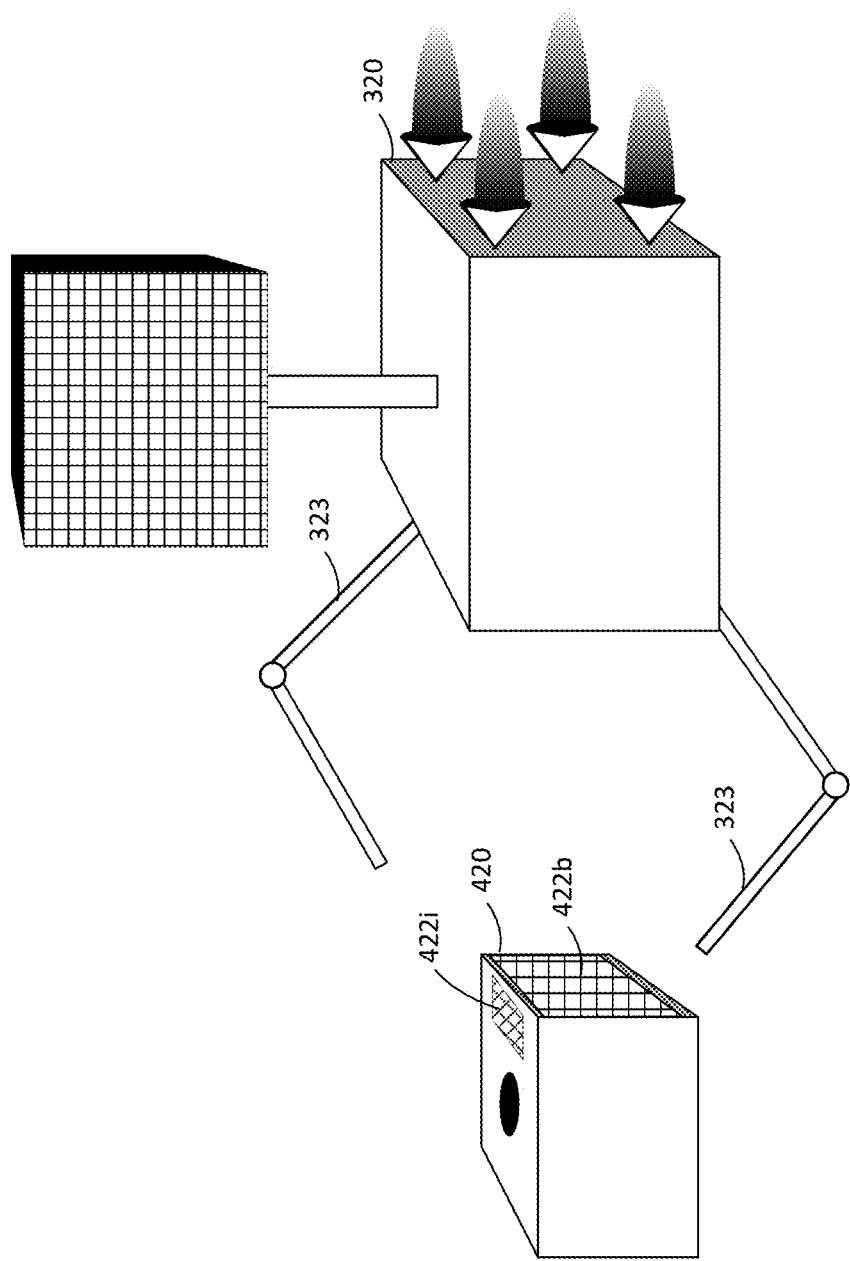
FIG. 6 is a high-level diagram of a servicing satellite approaching a limited function satellite.
Figure 7:
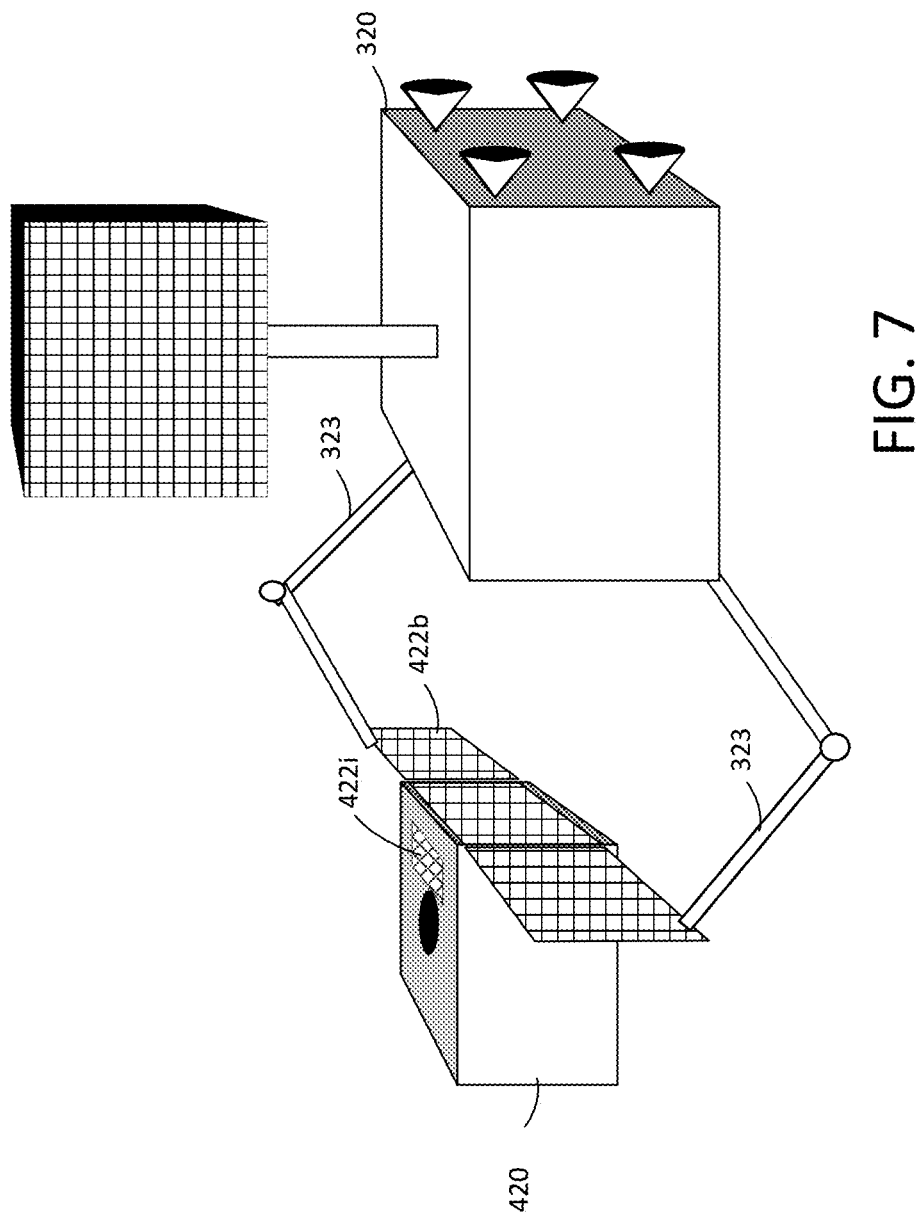
FIG. 7 is a high-level diagram of a servicing satellite deploying the solar array of a limited function satellite.
Figure 8:
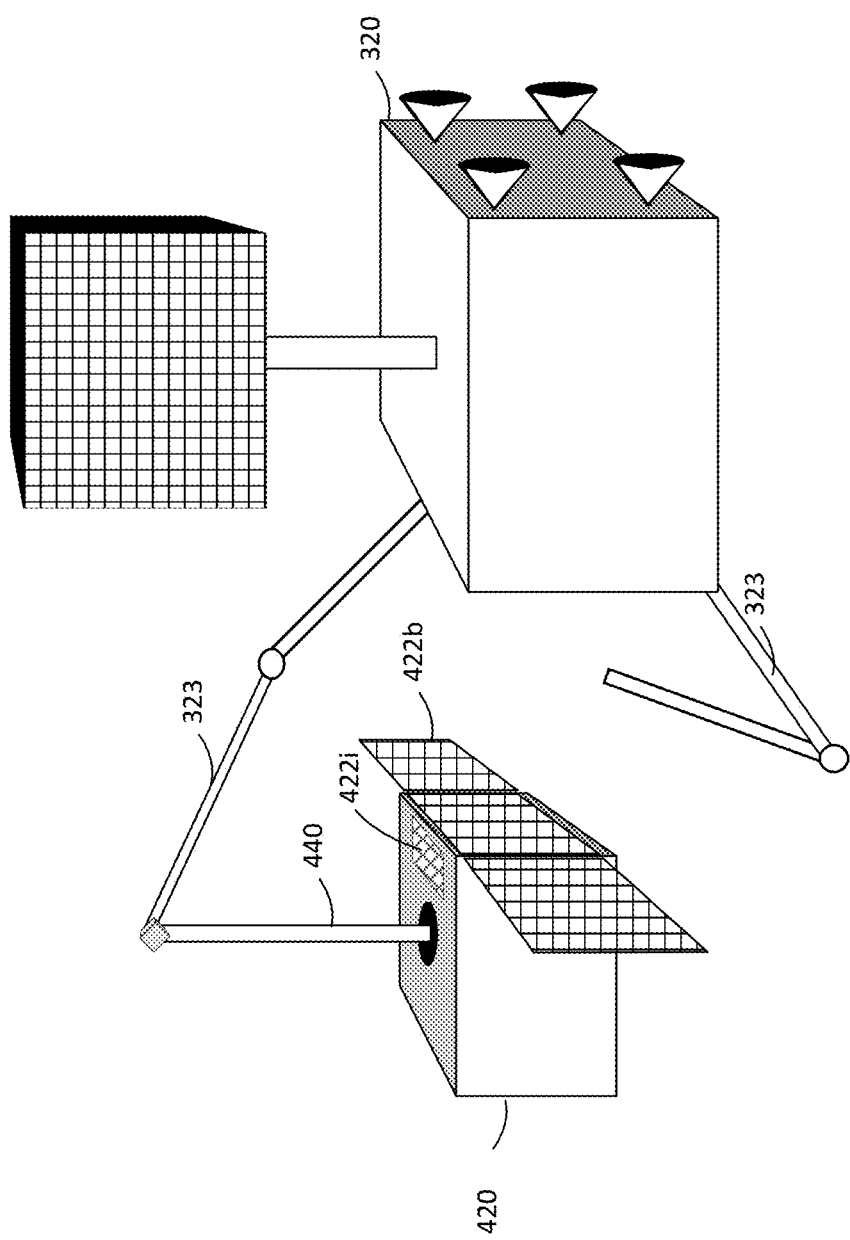
FIG. 8 is a high-level diagram of a servicing satellite deploying a gravity-gradient boom of a limited function satellite.

As illustrated in FIGS. 6-8, in one embodiment, each observation satellite 420 uses fixed-panel solar arrays that only point in one direction. In the constellation configuration shown in FIG. 1B, the sun is always on the same side of the satellite as it proceeds around the dusk/dawn sun-synchronous orbit. Since the sun is in a nearly constant direction, the observation satellite does not need to rotate to maintain alignment of the solar arrays with the sun.

As such, at step 506, a next observation satellite to be configured (deployed) is determined. This may be a pre-programmed sequence, a sequence determined by ground controllers, or determined based on proximity of the observation satellite to the servicing vehicle. At 508, the servicing vehicle 320 will engage the next observation satellite 420 to be configured using, for example its robotic arms 323 at 508. In one embodiment, if the observation satellite 420 is not positioned by the launch vehicle, the servicing vehicle 320 will position the observation satellite 420 in a determined position within the constellation. At 512, the servicing vehicle 320 will deploy the observation satellite's solar array(s), illustrated in FIG. 7. At 514, the servicing vehicle 320 will deploy the observation satellite's gravity-gradient boom, illustrated in FIG. 8. The gravity-gradient boom 440 as illustrated in FIG. 8 maintains the observation satellite 420 aligned with the local vertical. It is deployed in the direction away from Earth or the zenith direction by the servicing vehicle 320. This action by the servicing vehicle prevents the observation satellite 420 from deploying the boom toward Earth, which would leave it trapped in an undesirable orientation with the functional element 424 pointing away from Earth. The functional element 424 (such as imaging sensors) may be mounted on a lower face of the observation satellite 420 (opposing the gravity-gradient boom 440) and is pointed toward the area to be observed. If it is desired to calibrate the payload by pointing it at another celestial body, such as the moon, the servicing vehicle 320 could temporarily reorient the spacecraft to achieve this objective. If it is desired to operate the observation satellite in an inverted mode, e.g. to permit thermal radiation from Earth to warm the side of the observation satellite that is nominally directed away from Earth, the servicing vehicle 320 could invert the observation satellite 420, back away and let it operate in inverted orientation, and then return to it and restore it to nominal orientation with the functional element 424 directed at Earth.

Following completion of the activities at step 512 (illustrated in FIG. 8), the servicing vehicle 320 disengages from the observation satellite 420 and proceeds to another observation satellite 420 if needed at 516 or maintains itself in orbit until it is needed. At 518, if subsequent servicing of one of the observation satellites is needed, then such servicing may occur at 520. This may comprise the servicing vehicles circulating among the observation satellites 420, station keeping them, verifying their operation and occasionally dumping a retired observation satellite 420 into the atmosphere or into a graveyard orbit for disposal. If a particular observation satellite 420 in the constellation has severe issues with lunar eclipses, it can be assisted by a servicing vehicle as discussed below.

In the constellation of FIG. 2, the observation satellites enter the shadow of the moon 2 to 4 times each year. These lunar eclipses last up to 20 minutes but are nearly always partial because of the small apparent size of the moon. Therefore, some sunlight is available, also entrance and exit from the lunar shadow is gradual and does not generate a sharp thermal transient. Totality is very rare but if it occurs, it lasts only about a minute. Therefore, satellite power can be obtained from a low-cost, non-rechargeable battery if needed. Alternatively, no battery may be utilized in the observation satellite. Elimination of the battery is possible because a) the observation satellite might not be expected to perform observational work during a rare lunar eclipse and b) the temperature of the observation satellite will not decrease sufficiently during a relatively short partial eclipse and only briefly total lunar eclipse to harm the satellite. The observation satellite could include electrically powered heaters that are operated at a high level prior to and following the lunar eclipse to compensate for any heat loss during the eclipse. The observation satellite could also be placed in inverted mode as described above prior to a lunar eclipse to provide heating from Earth's albedo (reflected sunlight) and infrared thermal emissions to the portion of the satellite nominally directed away from Earth, which might include its thermal radiators 422*i*.

Following separation of the observation satellites 420 from the launch vehicle, there is a short period of time when each observation satellite 420 are on their own before the servicing vehicle engage and deploy their solar arrays and stabilization booms. It is advantageous to ensure that the observation satellites 420 do not become cold which may cause damage in the absence of power and proper shielding. In one embodiment, the observation satellites 420 are launched and deployed by a launch vehicle to a position where they are not in Earth's shadow, so they would not become cold as there is some exposure to the sun. During this period, the observation satellites 420 may still have some portion of their solar array(s) exposed to the sun to generate enough power during at least some of the time. The times at which the satellites could enter the moon's shadow can be predicted in advance because the orbital motion of the moon is well understood by those skilled in the art. Accordingly, launch can be delayed if the satellites are to enter the moon's shadow during the launch phase or shortly after they are separated from the launch vehicle. Launch may be planned to occur only at times when no lunar eclipses occur for multiple days after the satellites are carried into orbit. This would not unduly limit the times available for launch because lunar eclipses are rare.

In some embodiments, no batteries are included. In order to alleviate concerns about spacecraft power when rechargeable batteries are not included, the below technique may be used to ensure that power will be available some of the time. The power could be used to operate beacons or other low-power devices for at least part of the time to enable the observation satellites 420 to be tracked and for rudimentary telemetry to be sent from them to the ground or to the servicing vehicles.

Thus, in one embodiment, the observation satellites 420 can be caused to spin about a particular axis as they deploy from the launch vehicle. Alternatively, the servicing vehicles 320 could quickly travel among the spacecraft to put a spin on each observation satellite 420 and then, a short time later when the unit is spinning, back away and quickly move to the other observation satellites 420 to generate this initial spin. This entire operation would require far less time to complete than the deployment of the observation satellite 420 appendages and checkout required to put all of the units into operational use.

As noted, each observation satellites 420 may have a solar array 422*b* mounted on one face of the spacecraft body. The axis normal to this face may be aligned with the intermediate axis of inertia of the observation satellite 420, so the observation satellite 420 would experience an unstable spin when rotated around this axis. Again, deployment from the launch vehicle or spin up by the servicing vehicles 320 may initiate a rotation about this intermediate axis of inertia. This unstable spin would enable the solar array to scan the entire region of space visible to the satellite, enabling at least some sunlight to be converted into electricity over a period of only a few minutes. The spin would be at a slow rate so the servicing vehicles would still be able to capture and de-spin the observation satellites.

At deployment, mechanical damping is generally weak because the observation satellites 420 appendages are stowed and unable to flex. Under these conditions bodies undergo stable spin about their major and minor axes of inertia. These two principal axes are at right angles to each other. A third principal axis, perpendicular to both the major and minor axes, is the intermediate axis of inertia. A body will not undergo stable spin about this axis and the axis will not maintain a fixed orientation in inertial or non-rotating space. Instead, the axis itself will be displaced in a periodic fashion, traveling through an angle of 180° and back to zero again each cycle, provided the initial rotation was about the intermediate axis as illustrated in FIG. 9.

Figure 9:
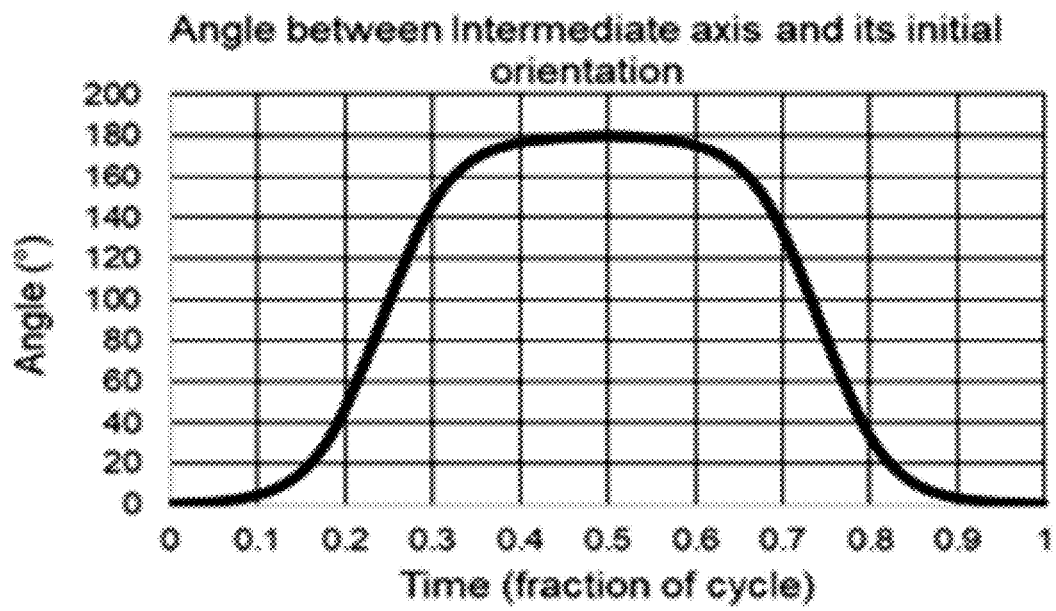
FIG. 9 shows a graph of the angle between the intermediate axis relative to the fraction of the rotation cycle time.

FIG. 9 shows a graph of the angle between the intermediate axis relative to the fraction of the rotation cycle time. The solar array would generate full power at the beginning and ending of this cycle provided that the axis normal to the solar array were aligned with the sun and the axis normal to the solar array is the intermediate axis of the spinning spacecraft. The cycle duration may be several minutes and is typically more than ten times the duration of a single rotation of the observation satellite.

Figure 10:
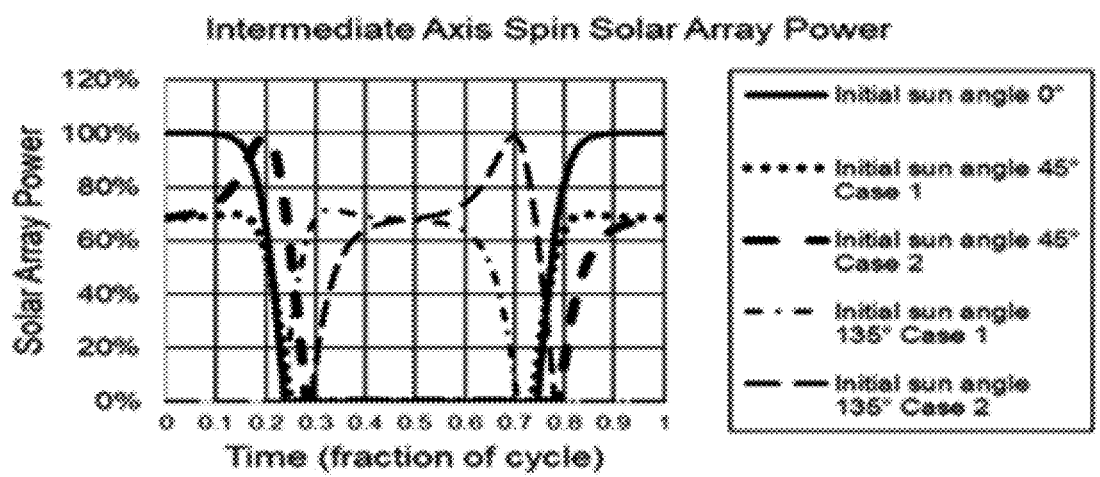
FIG. 10 shows a graph of the intermediate axis solar array power relative to the fraction of the rotation cycle time.

FIG. 10 shows a graph of the intermediate axis solar array power relative to the fraction of the rotation cycle time. The solid-line trace in the graph of FIG. 10 represents this case. During the middle portion of the cycle there is no power generated because the solar array 422b of the observation satellite 420 is directed away from the sun at this time. The other traces in the graph display results for four non-zero initial sun angles. Two of these angles are for cases in which the axis normal to the solar array, the intermediate axis of rotation of the spacecraft, makes an angle of 45° with respect to the sun at the start of the cycle. Nearly 70% power is available from the solar array at this time, but it falls to zero during the middle portion of the cycle as the solar array is directed away from the sun. The other two traces represent conditions in which the solar array 422b is directed away from the sun at the beginning of the cycle, making angles of 135° with respect to the direction to the sun. Here the solar array generates no power at the beginning of the cycle but does provide power during the middle portion of the cycle. In all cases with angles in the ranges described above, some power is generated during the cycle. Cases where the angle between the solar array axis and the sun are approximately 90° at the beginning of the cycle can involve little or no power being generated, and these would be avoided during mission operations.

Table 1 below displays the total amount of energy generated during a complete cycle for the five cases discussed. Energy collected by the solar array is greater than 25% of the energy collected when the solar array is continuously directed at the sun. It is a reasonable fraction of the total solar array power for the five cases discussed in detail above.

TABLE 1

| | Initial Sun Angle | | | | |
|---|---|---|---|---|---|
| | 0° | 45° Case 1 | 45° Case 2 | 135° Case 1 | 135° Case 2 |
| Energy Collected | 42.7% | 31.2% | 32.3% | 28% | 32.2% |

This intermediate axis technique has the advantage of assuring that the solar array scans widely through the space all around the vehicle, enabling some power to be obtained during each cycle. Part-time operation of observation satellites 420 can be managed even if no batteries are included or use of batteries can be minimized if non-rechargeable batteries are included. An additional use of this intermediate axis technique would involve enabling a sensor to scan the entire volume of space around a spacecraft, possibly to detect other vehicles or debris to support space awareness missions or to provide alarms if another body is approaching.

Note that the discussion above introduces many different features and many embodiments. It is to be understood that the above-described embodiments are not all mutually exclusive. That is, the features described above (even when described separately) can be combined in one or multiple embodiments.

For purposes of this document, it should be noted that the dimensions of the various features depicted in the FIGS. may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

What is claimed is:

1. A satellite observation system, comprising:
   a plurality of observation satellites comprising one or more passive sensors, each of the plurality of observation satellites configured with at least an undeployed solar array and a passive mechanical stabilization element, each of the plurality of observation satellites constructed without attitude positioning components and propulsion hardware, the plurality of observation satellites positioned in a dawn/dusk sun-synchronous orbital plane about a celestial body such that the one or more passive sensors are oriented toward the celestial body; and
   one or more servicing vehicles including at least one robotic arm configured to engage each of the plurality observation satellites, a processor, and a memory, the memory including instructions that cause the processor to direct the at least one robotic arm to deploy at least the solar array and the passive mechanical stabilization element of the observation satellites.

2. The observation system of claim 1 wherein the one or more servicing vehicles is configured to engage any of the plurality of observation satellites upon a malfunction of a component of the observation satellite.

3. The observation system of claim 1 wherein the one or more servicing vehicles is configured to reposition any of the plurality of observation satellites when a change in position of one or more observation satellites in the orbital plane is detected.

4. The observation system of claim 1 wherein the passive sensors are optical sensors.

5. The observation system of claim 1 wherein the one or more servicing vehicles is configured to engage the observation satellite to induce rotation of the observation satellite about an inertial axis of the observation satellite.

6. The observation system of claim 1 wherein each of the observation satellites is constructed without energy storage.

7. The observation system of claim 1 wherein the celestial body is Earth, and wherein the plurality of observation satellites and passive sensors, when positioned in the orbital plane, are evenly spaced such that every point on Earth's surface is observed as Earth rotates though the orbital plane.

8. A method of deploying an orbital observation system, comprising:
   launching a plurality of observation satellites comprising one or more passive sensors, each of the plurality of observation configured with at least an undeployed solar array and a passive mechanical stabilization element, each of the plurality of observational satellites configured without attitude positioning elements and propulsion hardware;
   positioning the plurality of observation satellites in a dawn/dusk sun-synchronous orbital plane about a celestial body such that the one or more passive sensors are oriented toward the celestial body;
   launching one or more servicing vehicles; and
   directing the one or more servicing vehicles to deploy at least the solar array and the passive mechanical stabilization element of each of the plurality observation satellites.

9. The method of claim 8 wherein each said launching of the plurality of observation satellites and one or more service vehicles is performed simultaneously in a single launch vehicle.

10. The method of claim 8 further including the one or more servicing vehicles engaging any of the plurality of observation satellites upon a malfunction of a component of the observation satellite.

11. The method of claim 8 further including the one or more servicing vehicles repositioning any of the plurality of observation satellites when a change in position of one or more observation satellites in the orbital plane is detected or desired.

12. The method of claim 8 further including positioning the plurality of observation satellites such that the orbital plane completely surrounds the celestial body and wherein the plurality of observation satellites and observation sensors, when positioned in the orbital plane, are evenly spaced such that every point on the celestial body's surface is exposed to the observation sensors of the plurality of observation satellites as the celestial body rotates though the orbital plane.

13. The method of claim 8 further including directing the one or more servicing vehicles to engage the observation satellite to induce rotation of the observation satellite about an inertial axis of the observation satellite, the inertial axis comprising an intermediate or unstable axis of rotation to permit the solar array to scan space thereby capturing sunlight and generating electrical power.

14. A satellite constellation system, comprising:
   a plurality of limited-function satellites comprising one or more passive sensors, each of the plurality of limited-function configured with at least an undeployed solar array and a passive mechanical stabilization element, each of the plurality of limited-function satellites constructed without attitude positioning components and propulsion hardware, the plurality of limited-function satellites positioned in a dawn/dusk sun-synchronous orbital plane about a celestial body such that the one or more passive sensors are oriented toward the celestial body; and
   one or more servicing vehicles including at least one robotic arm and a processor, the at least one robotic arm configured to engage each of the plurality limited-function satellites, a processor, and a memory, the memory including instructions that cause the processor to direct the at least one robotic arm to deploy at least the solar array and the passive mechanical stabilization element of the limited-function satellite.

15. The satellite system of claim 14 wherein the one or more servicing vehicles is configured to engage the limited-function satellite to induce rotation of the limited-function satellites about an inertial axis of the limited-function satellite.

16. The satellite system of claim 14 wherein the one or more servicing vehicles is configured to reposition any one of the plurality of limited-function satellites when a change in position of one of the plurality of limited-function satellites in the orbital plane is detected.

17. The satellite system of claim 14 wherein each of the limited-function satellites is constructed without energy storage.

18. The satellite system of claim 14 wherein the celestial body is Earth, and wherein the plurality of limited-function satellites and sensors, when positioned in the orbital plane, are evenly spaced such that every point on Earth's surface is observed as Earth rotates though the orbital plane.

19. The satellite system of claim 14 wherein the sensors are optical sensors.

20. The satellite system of claim 14 where the limited-function satellites are placed in an inverted attitude mode by the servicing vehicles and later restored to nominal attitude mode to enhance survivability during a lunar eclipse or other event.

* * * * *

UNITED STATES PATENT AND TRADEMARK OFFICE
CERTIFICATE OF CORRECTION

PATENT NO. : 11,820,535 B2
APPLICATION NO. : 17/478531
DATED : November 21, 2023
INVENTOR(S) : Andrew E. Turner It is certified that error appears in the above-identified patent and that said Letters Patent is hereby corrected as shown below:

In the Claims

• Column 10, Lines 65-66 (Claim 1): please replace "plurality observation" with --plurality of observation--

• Column 11, Line 25 (Claim 7): please replace "though the" with --through the--

• Column 11, Line 42 (Claim 8): please replace "plurality observation" with --plurality of observation--

• Column 12, Line 5 (Claim 12): please replace "though the" with --through the--

• Column 12, Line 51 (Claim 18): please replace "though the" with --through the--

Signed and Sealed this
Thirteenth Day of February, 2024

*Katherine Kelly Vidal*
Katherine Kelly Vidal
*Director of the United States Patent and Trademark Office*